Figure 1:
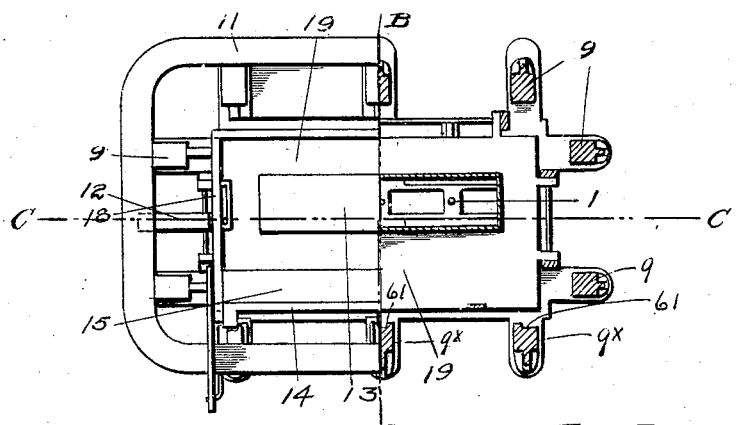

No. 869,271. PATENTED OCT. 29, 1907.
E. H. SOMERS.
MACHINE FOR MAKING BUILDING BLOCKS.
APPLICATION FILED JUNE 22, 1906.

7 SHEETS—SHEET 1.

WITNESSES: INVENTOR
Edward H. Somers
by James Hamilton
Attorney

No. 869,271. PATENTED OCT. 29, 1907.
E. H. SOMERS.
MACHINE FOR MAKING BUILDING BLOCKS.
APPLICATION FILED JUNE 22, 1906.

7 SHEETS—SHEET 2.

WITNESSES

INVENTOR
Edward H. Somers
by James Hamilton
Attorney

No. 869,271. PATENTED OCT. 29, 1907.
E. H. SOMERS.
MACHINE FOR MAKING BUILDING BLOCKS.
APPLICATION FILED JUNE 22, 1906.
7 SHEETS—SHEET 3.
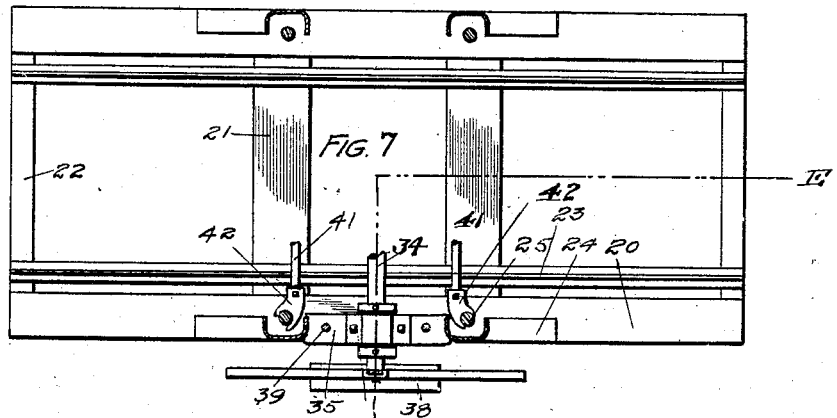
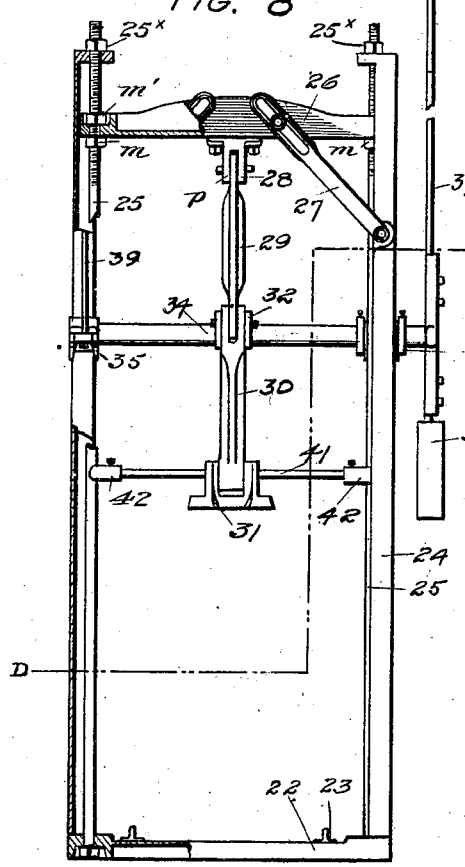
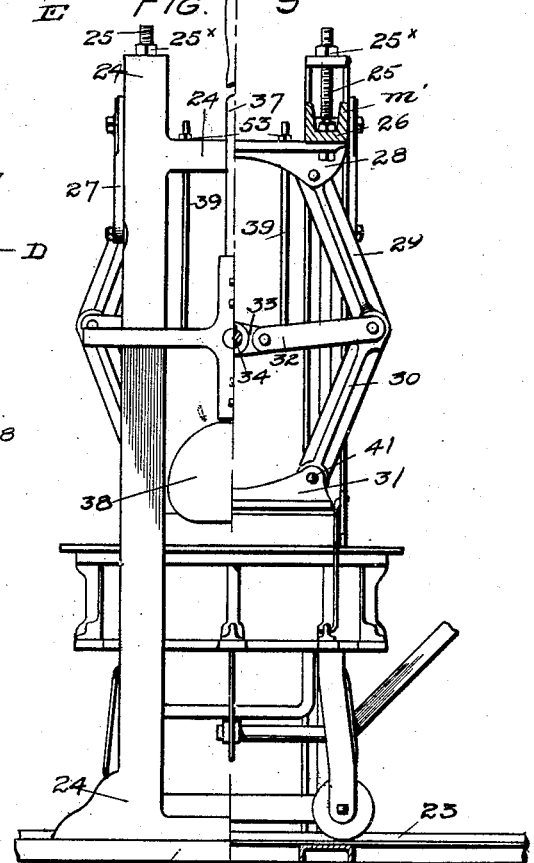
WITNESSES: INVENTOR No. 869,271. PATENTED OCT. 29, 1907.
E. H. SOMERS.
MACHINE FOR MAKING BUILDING BLOCKS.
APPLICATION FILED JUNE 22, 1906.

7 SHEETS—SHEET 4.

WITNESSES:

INVENTOR
Edward H. Somers
by James Hamilton
Attorney

No. 869,271. PATENTED OCT. 29, 1907.
E. H. SOMERS.
MACHINE FOR MAKING BUILDING BLOCKS.
APPLICATION FILED JUNE 22, 1906.

7 SHEETS—SHEET 5.

Witnesses

Inventor
Edward H. Somers
By James Hamilton
Attorney

No. 869,271. PATENTED OCT. 29, 1907.
E. H. SOMERS.
MACHINE FOR MAKING BUILDING BLOCKS.
APPLICATION FILED JUNE 22, 1906.
7 SHEETS—SHEET 6.
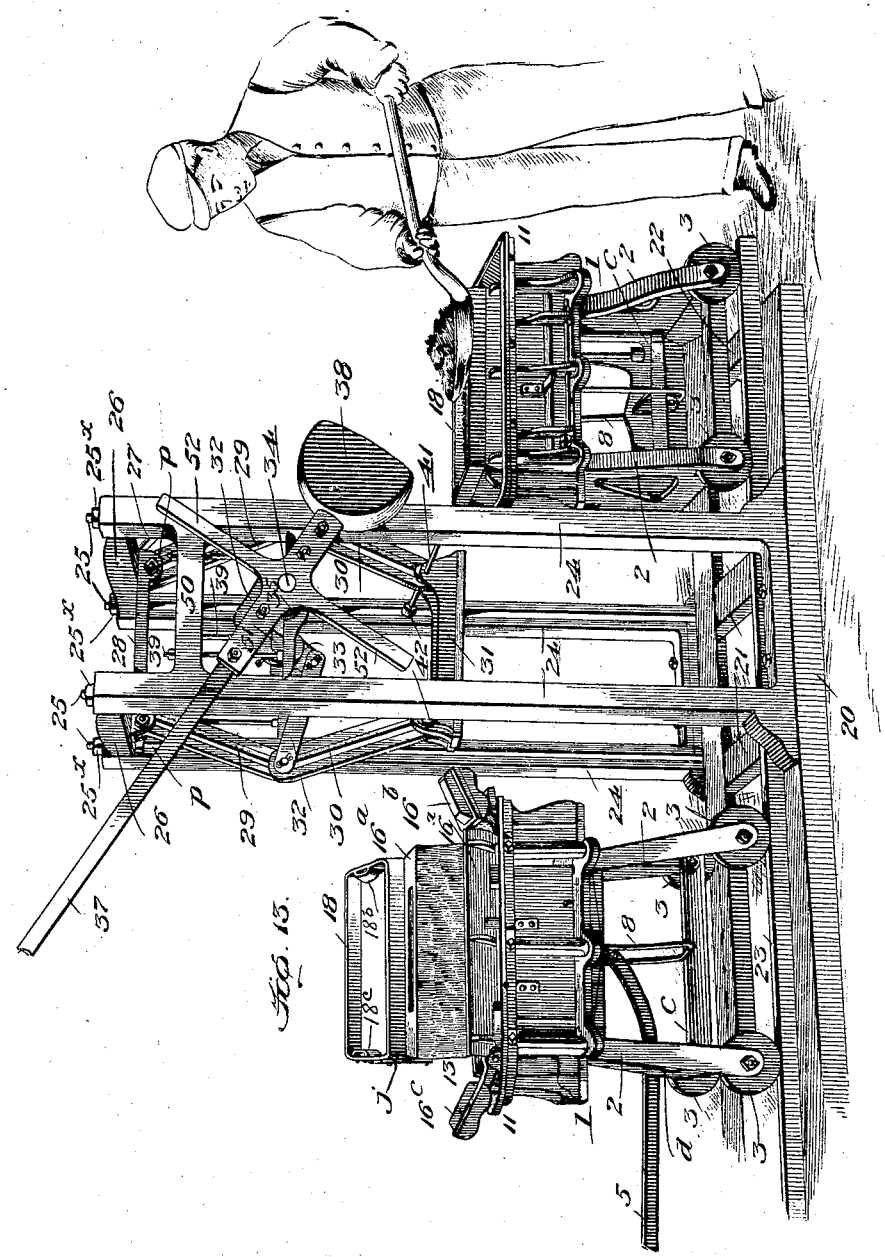
Witnesses
Inventor
Edward H. Somers
By James Hamilton
Attorney

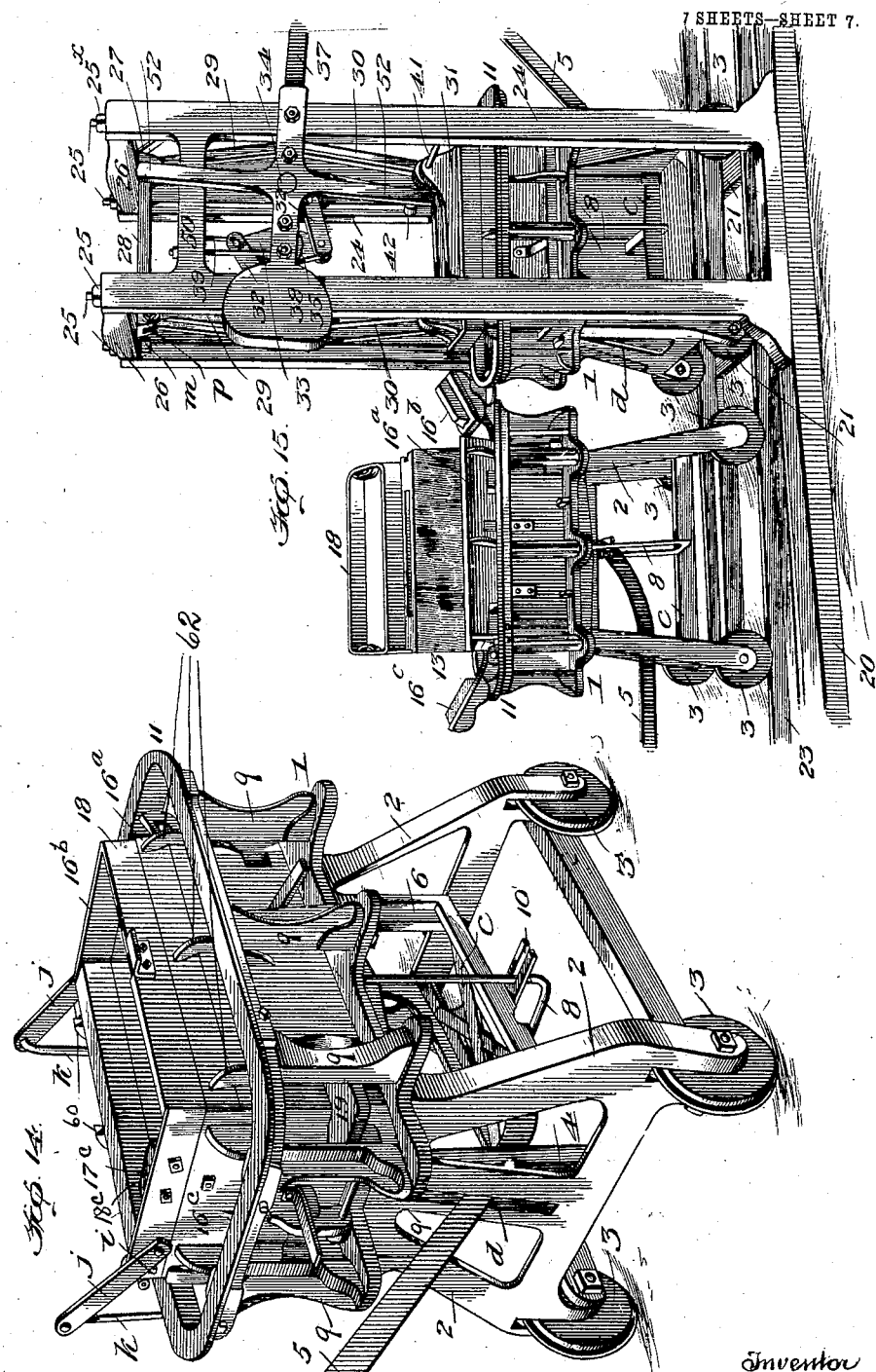

UNITED STATES PATENT OFFICE.

EDWARD H. SOMERS, OF URBANA, ILLINOIS, ASSIGNOR OF ONE-HALF TO FRANK A. SOMERS, OF URBANA, ILLINOIS.

MACHINE FOR MAKING BUILDING-BLOCKS.

No. 869,271.  Specification of Letters Patent.  Patented Oct. 29, 1907.

Application filed June 22, 1906. Serial No. 322,887.

*To all whom it may concern:*

Be it known that I, EDWARD H. SOMERS, a citizen of the United States, residing in Urbana, in the county of Champaign and State of Illinois, have invented certain new and useful Improvements in Machines for Making Building-Blocks, of which the following is a specification, reference being had to the accompanying drawings.

My invention relates to improvements in machines for the manufacture of concrete blocks used for building and other purposes; and one object of my invention is to obtain greater speed with less labor in the making of such blocks, and thereby to decrease the cost of production.

Another object of my invention consists in the provision of means whereby a greater pressure, and also a more uniform pressure, may be obtained in the making of such blocks.

A third object of my invention resides in the provision of means for the making of a concrete block of the class described which will, when laid in the building, permit an unobstructed circulation of air throughout the walls of the building.

A fourth object of my invention is to provide means for the making of a concrete block which, while permitting a free circulation of air throughout the walls, will be perfectly tied in the courses so that it is impossible for them to buckle.

A further object of my invention is to provide means capable of making a great variety of blocks with slight changes in the said means; and a sixth object of my invention lies in the provision of a machine of the class described which may be used with either the hand tamp or with a press.

Figure 2:
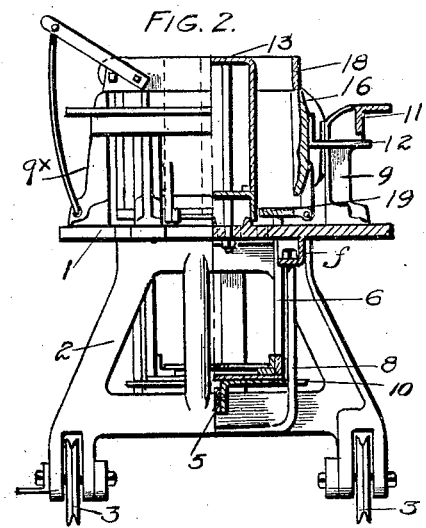
Figure 3:
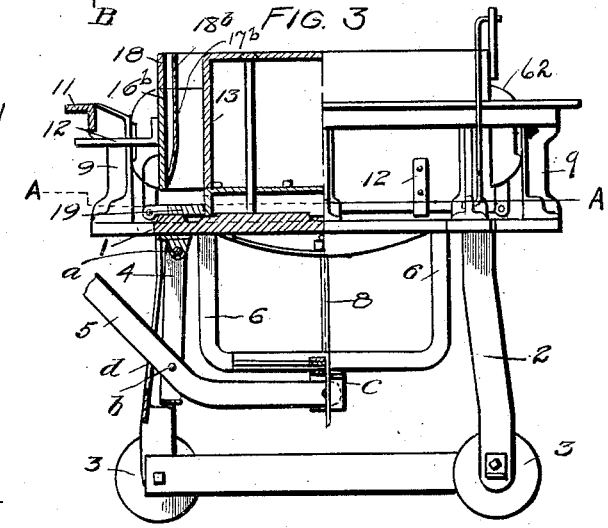
Figure 4:
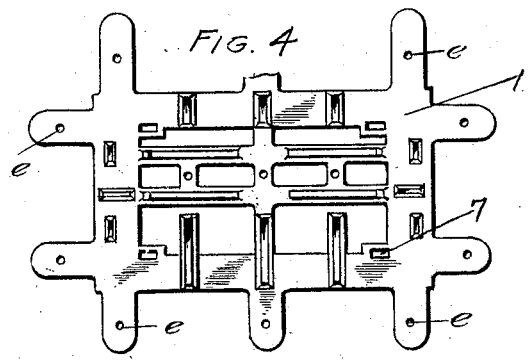
Figure 5:
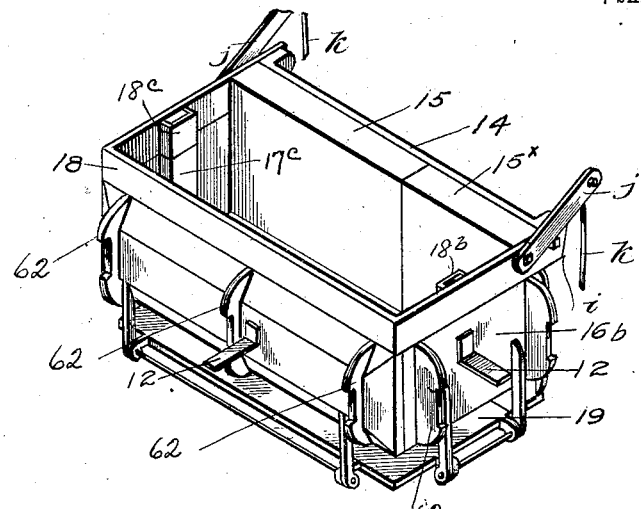
Figure 6:
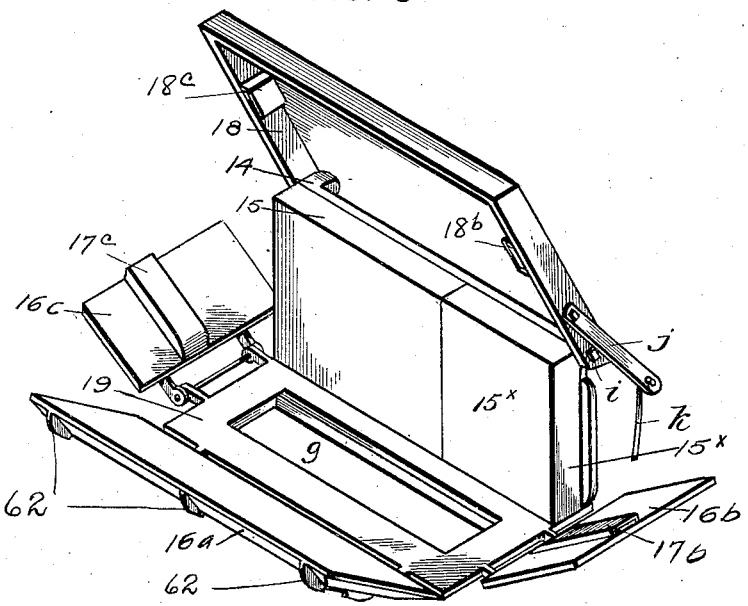
Figure 10:
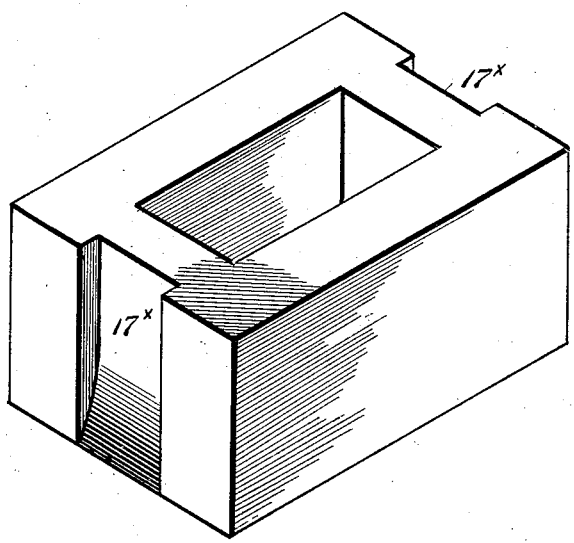
Figure 11:
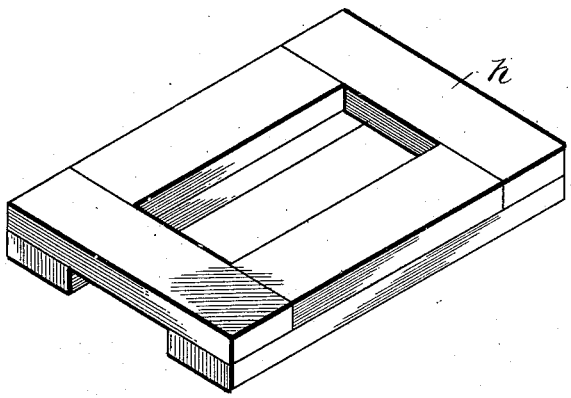
Figure 12:
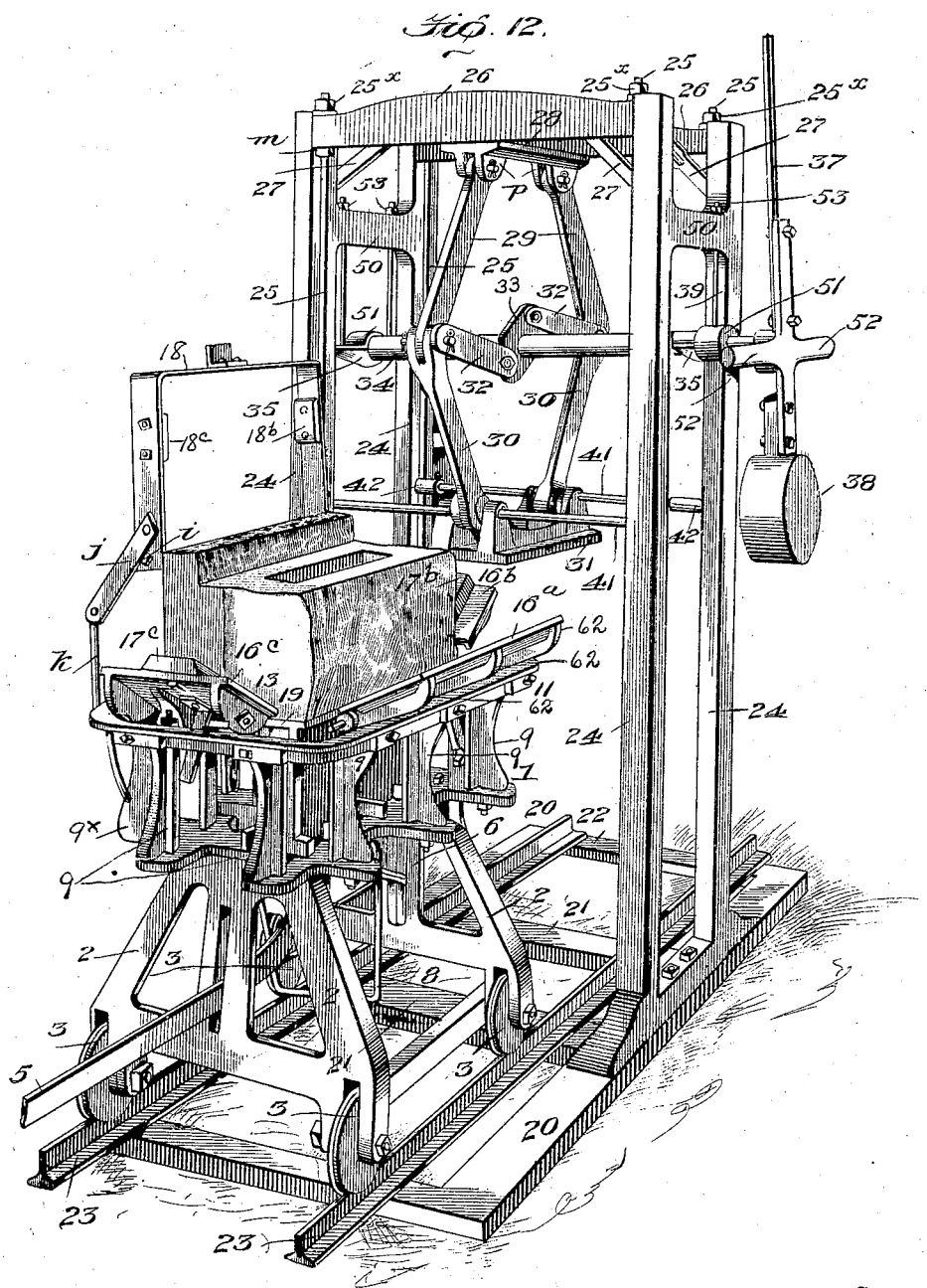

In the drawings illustrating the principle of my invention and the best mode now known to me of applying that principle, Figure 1 is a top plan view of my new mold-carrier, partly in sectional view on line A—A, of Fig. 3; Fig. 2 shows the mold-carrier in end view, partly in sectional view on the line B—B of Fig. 1; Fig. 3 illustrates the mold-carrier in side view, partly in sectional view of the line C—C of Fig. 1; Fig. 4 is a detail showing the table in top plan view; Fig. 5 is a perspective view of the box or mold closed; Fig. 6 is a perspective view of the box or mold open; Fig. 7 is a top plan view of the bottom of the press, partly in sectional view on the line D—D of Fig. 8; Fig. 8 is an end elevation of the press; Fig. 9 is a side elevation of the press, partly in sectional view on the line E—E, of Fig. 7; Fig. 10 shows a standard size block made by my new machine; Fig. 11 represents the pallet on which the block is made; Fig. 12 is a perspective view showing the mold-carrier mounted on the rails on the bottom of the press; Fig. 13 is a perspective showing two mold carriers mounted on the bottom rails of the press; Fig. 14 is a perspective view of the mold-carrier with the mold or box mounted therein; and Fig. 15 is a perspective showing the press forced down in the operation of making a block.

The table or bed-plate 1 is mounted upon the legs or supports 2 the lower ends of which are provided with grooved wheels 3 adapted to ride upon the rails 23 (Figs. 7 and 12) of the press, in case the press is used. Pivoted to the base-plate or table 1 at $a$ is a swinging arm 4 (Fig. 3) in which is pivotally mounted at $b$ the operating lever 5 which passes through the slotted upright or brace $d$ and one end of which is secured to the frame $c$ (Fig. 14) from which spring or project upwardly the posts 6 that pass through the holes 7 (Fig. 4) in the table 1. To keep the cementitious material from lodging on the table, the parts nearest the core are beveled. Fitted into the holes $e$ in the table 1 (Fig. 4) are lugs which project from the lower end of the guide-supports 9 $9^X$ the upper ends of which engage and support the annular rim-plate or band 11. The guide-posts $9^X$ are formed with grooves 61 in which engage the ribs 60 formed on the stationary wall 14 of the mold-box. The grooves 61 are clearly seen in Fig. 1. To the lug $f$ projecting from the bottom of the table 1 (Figs. 2 and 14) is secured a guide-rod 8 which is engaged by the fork 10 which projects from the frame $c$.

To the base 19 of the mold-box (Figs. 5 and 6) are hinged the front-door $16^a$ and the two end-doors $16^b$, $16^c$. These doors are provided with ribs 62 shorter than the ribs 60 (Fig. 14). The rear wall 14 is rigidly secured to the base so as to form a stationary side of the mold-box and to it are removably secured the lining pieces or sections 15, $15^X$. Because of the thickness of the lining sections 15, $15^X$, the core 13, which fits into the opening $g$ in the base 19, is not in the geometrical center of the mold-box. By removing the shorter section $15^X$, the mold-box is prepared for the manufacture of a corner block. By removing both sections, 15, $15^X$, and moving the core 13 to the center of the mold, a water-table may be made; also, a block, ten inches wide. In making the ordinary sized block, the rear wall occupies the relative position shown in Fig. 5. Further, in molding the ordinary sized block, there are removably secured to the end-doors $16^b$, $16^c$ the inwardly projecting core-blocks $17^b$, $17^c$, which form indentations $17^X$ shown in Fig. 10. In making concrete blocks, a wooden pallet $h$ (Fig. 11) is fitted under the lower edges of the doors $16^a$, $16^b$, $16^c$, in such a manner that the block is given a true edge.

The mold-box (Figs. 5, 6, 14) is provided with an automatic hopper 18 hinged to the rear wall 14 and connected by the straps $j$ to the rods $k$ which are secured to the mold-carrier (see Fig. 2). The straps $j$ each rest upon a stud $i$ which projects from the end wall of the hopper 18. This hopper fits accurately over the top edges of the doors $16^a$, $16^b$, $16^c$ and allows for and holds the additional concrete required in pressing the blocks to the desired size. If, after pressing, the block is found to be too large (or, in other words, rises above the level of said doors), the surplus material may be cut away by the use of an ordinary straight edge in the usual manner.
As is best seen in Fig. 5, the height of the wall 14 is greater than that of the doors, so that in closed position the hopper 18 rests accurately upon the upper edges of the doors. The hopper is further formed with coreblocks $18^c$, $18^b$, which in the closed position of the hopper register with and form a continuation of the core-blocks $17^c$ and $17^b$, respectively.
  After the core 13 has been properly positioned (in which case it passes through the central openings in both the base-plate 19 of the mold-box and in the pallet $h$, Fig. 11), the cementitious material is filled in around the core and is tamped by hand or is pressed by power. The free end of the operating lever 5 is then forced down, thereby forcing the posts 6 and the frame $c$ upwardly and carrying the mold-box out of the mold-carrier. The rod 8 coöperating with the fork 10 serves to guide the mold-box in its vertical movement. To each of the doors $16^a$, $16^b$, $16^c$ are secured one or more L-shaped detents 12, the projecting leg of which catches under the rim-plate 11 as the mold-box is being forced upwardly out of the mold-carrier. The tripping of the detents 12 by the rim-plate 11 throws the doors outwardly upon their hinges to the position shown in Figs. 6 and 12. As is shown in Fig. 3, there is a substantial interval between the face of the doors and the rim-plate or band 11; and this interval allows the doors to fall away from the block, when the detents are tripped as just described. At the same time the hopper 18 is forced upwardly and rearwardly, rotating upon its hinges due to the pull of the rods $k$ on the straps $j$ and the raising action of the studs $i$ upon the latter. The rods $k$, straps $j$ and hopper 18 connect the mold-box with the mold-carrier and serve to steady it in its raised position,—a result to which the engagement of the ribs 60 in the grooves 61 contributes.
The press is made up of the following parts coöperating in the manner hereinafter described: The basesills 20 (Figs. 7, 8, 9 and 12) are connected by the transverse end-plates 22 and center-plates 21, upon which are laid the rails 23 to form a track for the wheels 3 of the mold-carrier (Figs. 12 and 14). To each of the base-sills 20 (that is, on each side of the press) is bolted a pair of uprights or standards 24 through a hole in the inwardly projecting top of each of which there passes a press-rod 25 of which there are four in all, or one for each upright 24. The upper end of each press-rod 25 is threaded for the engagement of a nut $25^\times$ by which the press-rod is secured in place. Extending transversely across the press is a pair of cross-beams 26 through each end of each of which passes one of the press-rods 25. By rotating the nuts $m$ the cross-beam 26 may be raised and by tightening the locking nuts $m'$ the cross-beam may be secured in adjusted position. Bolted to each of the standards 24 is one end of a brace 27 (of which there are four in all) the other end of which is formed with an eye or elongated slot through which passes a bolt that secures the brace 27 at that end to one of the cross-beams 26. Thus, as the cross-beam 26 is raised and lowered to adjust it, the braces 27 may be adjusted. Secured to the bottom of both of the cross-beams 26 is a hanger-plate 28 formed with a pair of lugs $p$ (Fig. 12) at each of its ends; and pivotally mounted between each pair of lugs $p$ is the upper end of a link 29 to the lower end of which is pivotally secured a link 30. The links 30 carry the presser-block 31. Adjustably supported by the hanger-rods 39 from the cross-piece 50 on each side is a hanger 35 which is provided with a journal-box 51 through which passes a shaft 34 fast upon which is a double crank 33 connected by links 32, one which extends from each of its ends, to the bend or knee formed by the junction of the links 29 and 30. To rotate the shaft 34, it is provided with a hand-lever 37 fast upon one of its ends. The counterweight 38 serves to bring the lever 37 to a vertical position and raises the presser-block 31 after the operation of pressing is completed. The balance-arms 52 also aid in thus returning the lever 37 to its normal (vertical) position. By means of the nuts 53 the vertical distance of the shaft 34 from the cross-pieces 50 may be adjusted. The whole pressing mechanism is so adjusted that at the time the presser-block 31 is in its lowermost position, the links 29, 30 are in the same straight line. The presser-block 31 is pivotally secured to the lower end of each of the links 30 by the rod 41 which extends across the press and is provided at each of its ends with a guide-piece 42 adapted to engage the press-rod 25 adjacent thereto (see Figs. 7, 8, 12).

As shown in Figs. 13 and 15, two mold-carriers may be used with my press, the mold-carriers being run alternately under the press from either end of the track. Thus, it is possible to run under the press one mold-carrier, while a block is being removed from the other; or, while the other is being filled. Further, one mold-carrier may be used for the making of blocks with a rock face, while the other mold-carrier is used for the making of smooth-face blocks; or, generally speaking, blocks of two different designs may be made by using the same press with two mold-carriers, alternately.

By referring to Figs. 6 and 10, particularly, it will be seen that the projecting core-blocks $17^b$, $17^c$, taper to a point near the lower edge of the door to which they are respectively secured; and this form of the coreblock results in producing an indentation $17^\times$ in the block made complementary to the core-block and formed near its lower edge with a crust. Hence, (see Fig. 10), when two of the building blocks are placed end to end, these indentations or recesses $17^\times$ combine to form a pocket for the reception of mortar, thereby making a solid mortar joint and adding greatly to the strength of the wall.

What I claim is:

1. In a machine for making building blocks, the combination of a support; a mold-box mounted thereon free to move relatively thereto; a hopper mounted on said moldbox free to move to and from operative position thereon; and mechanism by which the movement of said mold-box relatively to its said support moves said hopper to and from operative position.

2. In a machine for making building blocks, the combination of a mold-box consisting of a base-plate, a stationary wall secured thereto and doors rotatably mounted on said base-plate; with a hopper movably secured to said wall and adapted to fit accurately upon the top edges of said doors a support for said mold-box on which the latter is free to move; and mechanism connecting said mold-box, hopper and support, said mechanism causing the movement of said mold-box to move said hopper to and from operative position.

3. In a machine for making building blocks, the combination of a mold-box consisting of a base-plate, a stationary wall secured thereto and doors rotatably mounted on said base-plate, said wall being of greater height than said doors; with a hopper pivotally secured to said wall and adapted to fit upon the top edges of said doors in extension thereof.

4. In a machine for making building blocks, the combination with a removable mold-box, of a mold-carrier comprising a table upon which the mold-box rests; posts adapted to be moved through said table; a frame carrying said posts; an operating lever secured to said frame; a fork projecting from said frame; and a guide-rod engaged by said fork.

5. In a machine for making building blocks, the combination with a mold-carrier, of a mold-box removably mounted therein; a hopper hinged to said mold-box and operatively connected with said mold-carrier; and means mounted in said mold-carrier for ejecting said mold-box from said carrier, whereby said hopper is swung up from over the mold-box.

6. In a machine for making building blocks, the combination with suitable supporting members, of a pair of adjustable cross-beams mounted therebetween; two pairs of coöperating links, one link of each pair being pivotally secured to said cross-beams and the other link of each pair being secured to a presser-block; said presser-block; a shaft rotatably mounted in hangers; said hangers adjustably mounted in said supporting members; and means operatively connecting said links with said shaft, whereby the rotation of said shaft causes said presser-block to be raised and lowered.

7. In a machine for making building blocks, the combination with suitable supporting members, of threaded press-rods mounted therein; cross-beams adjustably mounted on said press-rods; two pairs of coöperating links, one link of each pair being pivotally secured to said cross-beams and the other link of each pair being connected with a presser-block; a pair of shaft-hangers; means for raising and lowering said shaft-hangers independently of said cross beams; a shaft rotatably mounted in said hangers; and means operatively connecting said shaft with said links, whereby the rotation of said shaft raises and lowers said presser-block.

8. In a machine for making building blocks, the combination with suitable supporting members, of press-rods secured thereto; cross-beams adjustably mounted on said press-rods; slotted braces which connect said cross-beams with said supporting members; a presser-block; jointed members connecting said presser-block with said cross-beams; and means for operating said jointed members to reciprocate said presser-block.

9. In a machine for making building blocks, the combination of presser-rods; cross-beams adjustably mounted thereon; a presser-block; jointed members connecting said presser-block and said cross-beams; and guides connecting said presser-block and press-rods.

10. In a machine for making building blocks, the combination with a mold-box the walls of which are provided with core-blocks, of a hopper pivotally secured to said mold-box and provided with core-blocks; the latter registering in closed position with the core-blocks of said mold-box and forming a continuation of the same.

11. In a machine for making building blocks, the combination of a mold-carrier; a mold-box free to be moved into and out of the same; mechanism for holding said mold-box steady in its raised position; and means independent of said mechanism for moving said mold-box.

12. In a machine for making building blocks, the combination of a mold-carrier; a mold-box free to be moved into and out of the same and provided with a stationary wall; mechanism for moving said mold-box; and guiding devices mounted on said stationary wall and engaging said mold-carrier, said devices being independent of said mechanism.

13. In a machine for making building blocks, the combination of a mold-carrier; a mold-box mounted therein free to be moved relatively thereto; a hopper mounted on said mold-box free to move to and from operative position thereon; and mechanism for raising and lowering said mold-box and moving said hopper from and to operative position.

14. In a machine for making building blocks, the combination of a mold-carrier; a mold-box mounted therein free to be moved relatively thereto, said mold-box being provided with rotatable doors; a hopper mounted on said mold-box free to be moved to and from operative position thereon; and mechanism for raising said mold-box, opening said doors and moving said hopper from operative position.

15. In a machine for making building blocks, the combination of a mold-carrier; a mold-box movably mounted therein; said mold-box being provided with rotatable doors; a hopper movably mounted on said mold-box; and mechanism for lowering said mold-box, closing said doors and moving said hopper to operative position.

In testimony whereof I have hereunto set my hand in the presence of two witnesses at said Urbana this 14th day of June, 1906.

EDWARD H. SOMERS.

Witnesses:
W. A. MULLIN,
A. M. FANLEY.